United States Patent [19]
Segal

[11] Patent Number: 5,383,492
[45] Date of Patent: Jan. 24, 1995

[54] GAS CONNECTOR ASSEMBLY

[75] Inventor: Evan J. Segal, Pittsburgh, Pa.

[73] Assignee: Dormont Manufacturing Co., Export, Pa.

[21] Appl. No.: 178,023

[22] Filed: Jan. 6, 1994

Related U.S. Application Data

[63] Continuation-in-part of Ser. No. 111,717, Aug. 25, 1993, abandoned.

[51] Int. Cl.⁶ .............................................. F16L 37/28
[52] U.S. Cl. ........................... 137/614.06; 137/613; 285/168
[58] Field of Search ............... 137/613, 614.04, 614.06, 137/883, 887; 251/149.9; 285/168, 276, 281

[56] References Cited

U.S. PATENT DOCUMENTS

| | | | |
|---|---|---|---|
| 2,490,839 | 12/1949 | Shaffer et al. | 137/883 |
| 3,558,163 | 1/1971 | Moore et al. | 285/168 |
| 3,680,591 | 8/1972 | Vik | 137/614 |
| 3,858,601 | 1/1975 | Ensinger | 137/374 |
| 3,928,711 | 12/1975 | Jakobsen | 137/883 |
| 4,009,729 | 3/1977 | Vik | 137/614 |
| 4,552,333 | 11/1985 | Niemi | 251/149 |
| 4,615,547 | 10/1986 | Sutcliffe et al. | 285/136 |
| 4,870,994 | 10/1989 | Raymond | 137/883 |
| 5,074,332 | 12/1991 | Jones | 137/614 |
| 5,172,723 | 12/1992 | Sturgis | 137/613 |
| 5,178,422 | 1/1993 | Sekerchak | 285/160 |

OTHER PUBLICATIONS

Gaylord Industries, Inc., Distributor Utility Distribution System Brochure, 1992.

Primary Examiner—A. Michael Chambers
Attorney, Agent, or Firm—Buchanan Ingersoll; Paul A. Beck

[57] ABSTRACT

An apparatus for delivering natural gas or liquid propane under pressure from a fixed gas pipe source to a gas appliance mounted on casters and movable to and away from the fixed gas pipe source. The apparatus includes a connector, a unitary valve assembly member and in some instances, swivels. The unitary valve assembly member is directly connected to the fixed gas pipe source and includes a ball valve, a check valve, a quick disconnect coupling and an operating device for manually positioning the ball valve in an open or closed position. One variation of the unitary valve assembly member incorporates an operating device which prevents the quick disconnect coupling from being disconnected with the ball valve in an open position. The unitary valve assembly member may further include a temperature sensitive device incorporated within the check valve such that at a predetermined temperature the check valve will close in order to prevent ignition of the gas supply at elevated temperatures. The fixed gas pipe source can either be mounted on or extending from a wall or be mounted in a utility distribution system. The utility distribution system can take the form of an island configuration, a wall-mounted configuration, a ceiling-mounted configuration or a tray slide/counter configuration.

33 Claims, 16 Drawing Sheets

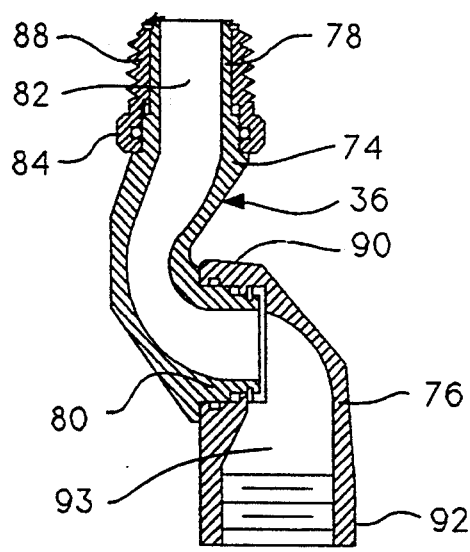
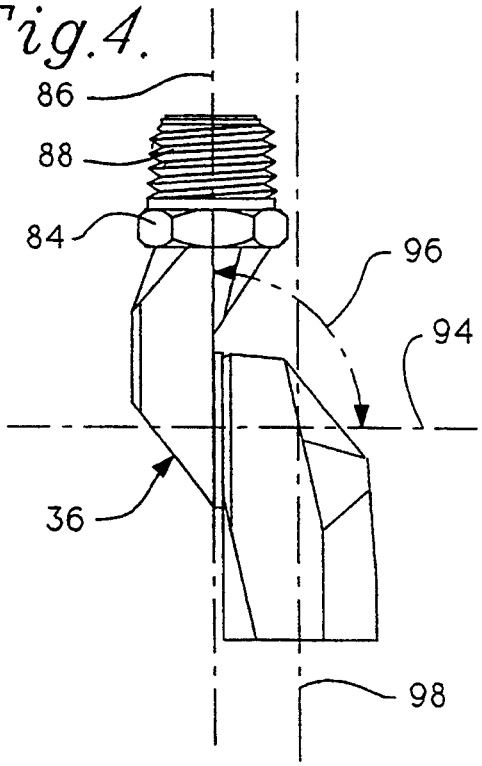
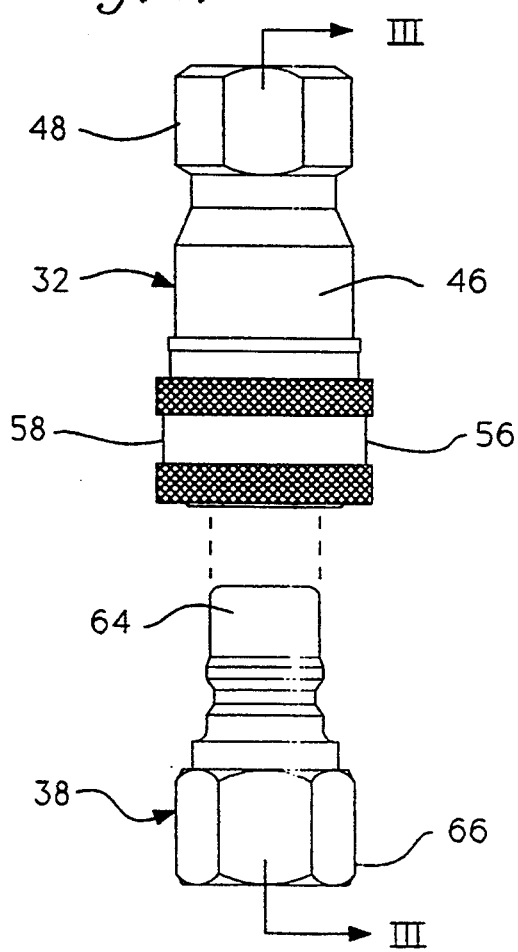
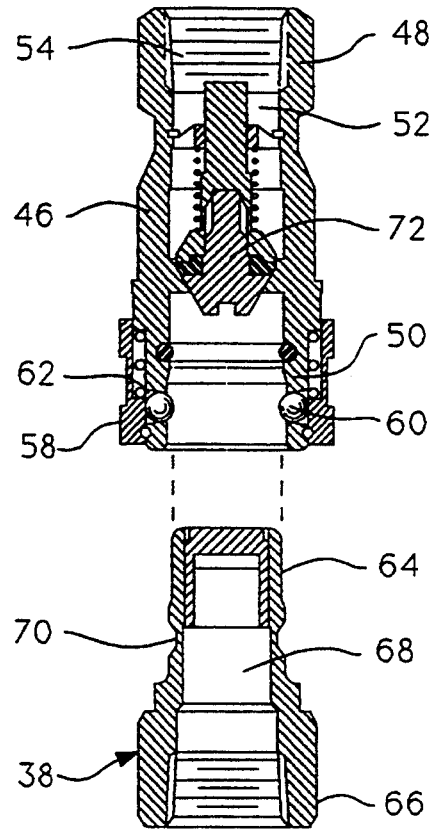

GAS CONNECTOR ASSEMBLY

This is a continuation-in-part of application Ser. No. 111,717, filed Aug. 25, 1993 now abandoned.

BACKGROUND OF THE INVENTION

1. Field of the Invention

This invention relates to an apparatus for delivering natural gas or liquid propane under pressure from a fixed pipe source to a natural gas cooking appliance moveable on casters toward and away from the fixed pipe source. The apparatus includes a unitary valve assembly member, a flexible connector, and in some instances swivels. The unitary valve assembly member is preferably directly coupled to the fixed pipe source. The fixed pipe source can be mounted on or extending from a wall or mounted in a utility distribution system. The apparatus is for use in the commercial food service industry.

2. Description of the Prior Art

Gas appliance connector assemblies currently are being used in the commercial food service industry to connect a cooking appliance to a supply source of natural gas or liquid propane under pressure. The natural gas supply source is a fixed pipe. The fixed pipe source is usually mounted on or extended from a wall surface in a large, commercial kitchen environment where the cooking appliance has heavy, continuous use throughout the day. The appliance may be a fryer, a grill or another type of cooking appliance.

The apparatus shown in FIG. 1 may be utilized to deliver natural gas or liquid propane from a fixed pipe source 20 extending from a wall surface 22 to a natural gas appliance 24. The apparatus includes an elbow joint 26 connected at one end to the fixed pipe source 20 and connected at another end to a shut-off valve 28. The shut-off valve 28 includes a handle 30 used to manually open and close the shut-off valve 28. The end of the shut-off valve 28 opposite the elbow joint 26 is connected to a quick disconnect coupling member 32 by a double-sided male threaded adapter 34. The other end of the quick disconnect coupling member 32 is coupled to a swivel 36 by an adapter plug 38. The quick disconnect coupling member 32, the adapter plug 38 and the swivel 36 are shown in greater detail in FIGS. 2 through 5. A flexible corrugated tubing connector 40 connects the swivel 36 to gas appliance 24 by a second elbow joint 42. The gas appliance 24 is limited as to the distance it can be moved from the wall surface 22 by the length of chain 44.

Referring to FIGS. 2 and 3, the quick disconnect coupling member 32 includes a main body 46 having a first end 48, a second end 50 and an axial bore 52 which extends between the first end 48 and second end 50. The first end 48 is provided with a female internally threaded connection 54 and a quick disconnect generally shown as 56 is located at the second end 50. The quick disconnect 56 includes a spring-biased sliding ring 58 and ball bearings 60 positioned within apertures 62 located about the circumference of the main body second end 50. Adapter plug 38 includes a male end 64, an internally threaded female end 66, and an axial bore 68 extending between the male end 64 and female end 66. The male end 64 is provided with a detent 70 located on the exterior surface of the adapter plug 38. When the spring-biased sliding ring 58 is forced in the direction of the main body first end 48 and adapter plug male end 64 is inserted within main body axial bore 52, ball bearings 60 engage adapter male end 64. As sliding ring 58 returns to its initial position, the interior surface of the sliding ring 58 forces the ball bearings 60 into contact with the adapter plug detent 70 locking the adapter plug 38 within the main body 46. Further when the adapter plug male end 64 enters the main body axial bore 52, check valve 72 is forced toward the main body first end 48 and into an open position allowing natural gas to flow through the main body axial bore 52. When adapter plug 38 is removed from main body axial bore 52, the check valve will move into a closed position.

FIGS. 4 and 5 show swivel 36 having a first body member 74, and a second body member 76. The first body member 74 includes a first end 78, a second end 80 and a bore 82 which extends between the first end 78 and second end 80. A nut 84 is rotatably coupled to the first body member first end 78. The first body member 74 is rotatable about a fixed first axis 86 with respect to nut 84. Nut 84 has a male threaded portion 88 extending therefrom which is coupled to the adapter plug female end 66 shown in FIGS. 1 through 5. Once connected, the swivel male threaded portion 88 is fixed and does not rotate with respect to adapter plug 38. The first body member first end 78 can rotate about the fixed first axis 86 with respect to the swivel male threaded portion 88 and nut 84.

The second body member 76 has a first end 90, a second end 92 and a bore 93 which extends between the first end 90 and second end 92. The second body member first end 90 is rotatably coupled to the first body member second end 80. The second body member first end 90 is rotatable about a second axis 94 which intersects fixed first axis 86. The second axis 94 is oriented at an angle 96 and is rotatable with respect to the fixed first axis 86. The second body member 76 has a third axis 98. The third axis 98 is parallel to and rotatable about the fixed first axis 86. The third axis 98 intersects the second axis 94. Swivel 36 is described in more detail in U.S. Pat. No. 5,178,422, issued Jan. 12, 1993, to Sekerchak.

When the gas connector assembly apparatus shown in FIGS. 1 thru 5 is assembled it can be assembled improperly resulting in a natural gas or liquid propane leak. Specifically, the quick disconnect coupling member second end 50 may be connected to the shut-off valve 28 where the adapter plug female end 66 engages the double-sided male threaded member 34 and the main body first end 48 is connected to swivel male threaded portion 88. In this configuration when the quick disconnect coupling member 32 and the adapter plug 38 are separated, the adapter plug 38 remains threaded to double-sided male threaded adapter 34. The entire quick disconnect 32 is separated from the double-sided threaded adapter 34 and unless shut-off valve 28 is closed the natural gas will continue to flow creating a dangerous situation.

The chances of the improperly assembled quick disconnect coupling member 32 described above being disconnected increase in the commercial food industry environment because this is the area where gas quick disconnects are used. Many gas appliances are usually located together. It is not uncommon to have fryers, numerous grills and other cooking equipment in the same location. Substantial grease and dirt is deposited on the appliances. The floor under the appliance and the wall adjacent the appliance need regular cleaning to prevent grease from building with dirt, grime and food deposits causing sanitation problems. To clean the area thoroughly, the appliances must be moved. Floor space is at a premium in commercial kitchens, thus the equipment muse be cleaned as fast as possible and moved back into place. By disconnecting the gas connector assembly at the quick disconnect coupling the gas appliance 24 and the connector 40 can be moved out of the way of the cleaning personnel preventing any unnecessary delays, The quick-disconnect coupling member is disconnected and reconnected daily by untrained individuals, Cleaning personnel not knowing the gas connector assembly is improperly assembled will disconnect the improperly assembled gas connector assembly at the quick disconnect coupling which may result in leakage of natural gas into the environment.

SUMMARY OF THE INVENTION

I provide an apparatus for delivering natural gas or liquid propane from a fixed natural gas pipe source to a gas appliance where the gas appliance is mounted on casters and is movable toward and away from the fixed pipe source. The apparatus includes a unitary valve assembly member, a flexible connector and in some instances, swivels. The unitary valve assembly member includes a ball valve, a check valve, a quick disconnect coupling and operating means for manually opening and closing the ball valve. By providing all of these elements in a preassembled unitary construction, the chance of the quick disconnect coupling being installed in an improper manner and resulting in a natural gas leak is substantially eliminated. The unitary construction of the unitary valve assembly member does not allow the unitary valve assembly member to be connected in the total gas connector assembly in a manner in which the check valve can be separated from the ball valve after the adapter plug and the quick disconnect coupling disengage. By placing the ball valve and the check valve within a unitary construction, the check valve will always close off the flow of natural gas when the adapter plug is disengaged from the quick disconnect coupling.

I further provide for the unitary valve assembly member to be connected directly to the fixed natural gas source pipe so that it meets the standards of ANSI Z223.1 (The National Fuel Gas Code) which requires an accessible manual shut-off valve be installed at the outlet of the natural gas supply system upstream with respect to the flexible connector. Further, the ball valve, flexible connector and quick disconnect meet ANSI Z21.15, ANSI Z21.69 and ANSI Z21.41, respectively.

I provide for the use of swivels in my gas connector assembly. For instance, one swivel can be connected at each end of the flexible connector allowing for a greater range of rotational movement of the flexible connector thus, eliminating stress and strain on the flexible connector. Further, when only one swivel is utilized in my gas connector assembly it can be placed at either end of the flexible connector depending on which flexible connector end necessitates a greater range of rotational movement.

I provide the unitary valve assembly member operating means with a mechanism which prevents the quick disconnect coupling from being disconnected before the ball valve is completely closed.

The unitary valve assembly member check valve may include temperature sensitive means for closing the check valve when a predetermined temperature is reached thus, preventing ignition of the natural gas or liquid propane at high temperatures.

I further provide my gas connector assembly with a unitary valve assembly member quick disconnect which is connected by inserting the adapter plug into the quick disconnect coupling with only one motion.

The fixed gas pipe source may be housed in a utility distribution system in order to make the distribution of the gas most convenient. The utility distribution system can take the forms of many configurations such as an island configuration, a wall-mounted configuration, a ceiling-mounted configuration or a tray slide/counter configuration.

Other details, objects and advantages of the invention will become apparent as the following description of the present preferred embodiments thereof proceeds.

BRIEF DESCRIPTION OF THE DRAWINGS

FIG. 2 is an elevational view of the quick disconnect coupling utilized in the gas connector assembly shown in FIG. 1.

FIG. 3 is a sectional view of the quick disconnect coupling shown in FIG. 2 taken along line III—III.

FIG. 4 is an elevational view of the swivel utilized in the gas connector assembly shown in FIG. 1.

FIG. 5 is a transverse vertical sectional view of the swivel shown in FIG. 4.

Corresponding reference numerals indicate corresponding parts throughout the several views of the drawings.

DETAILED DESCRIPTION OF THE INVENTION

FIGS. 6 thru 11 illustrate the presently preferred gas connector assembly connecting a fixed pipe source to a gas appliance and having a unitary valve assembly member and a flexible connector. The unitary valve assembly member is directly connected to the fixed pipe source and includes a ball valve, a check valve, a quick disconnect and operating means for opening and closing the ball valve.

Figure 1:
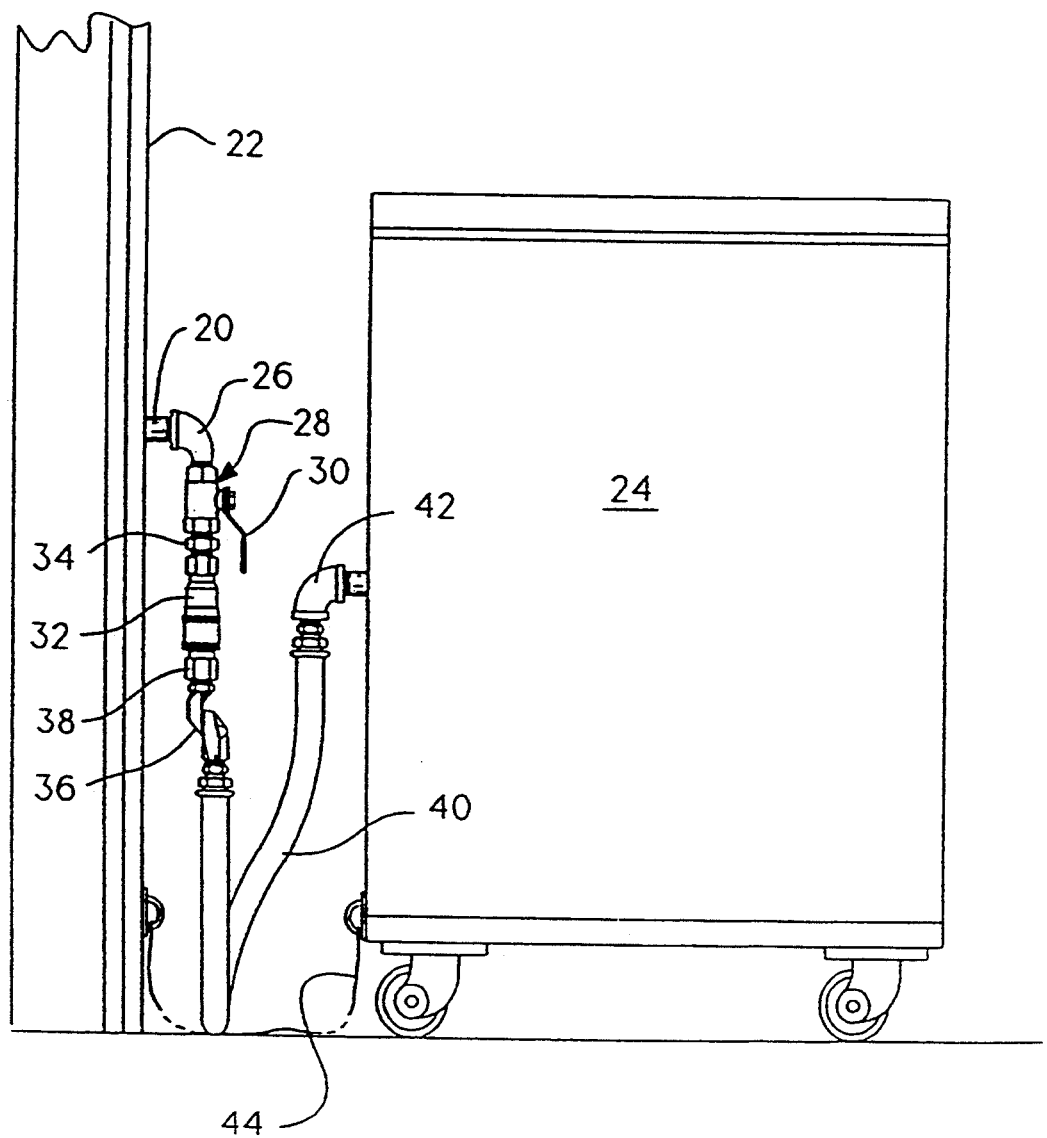
FIG. 1 is an elevational view of a prior art gas connector assembly.
Figure 6:
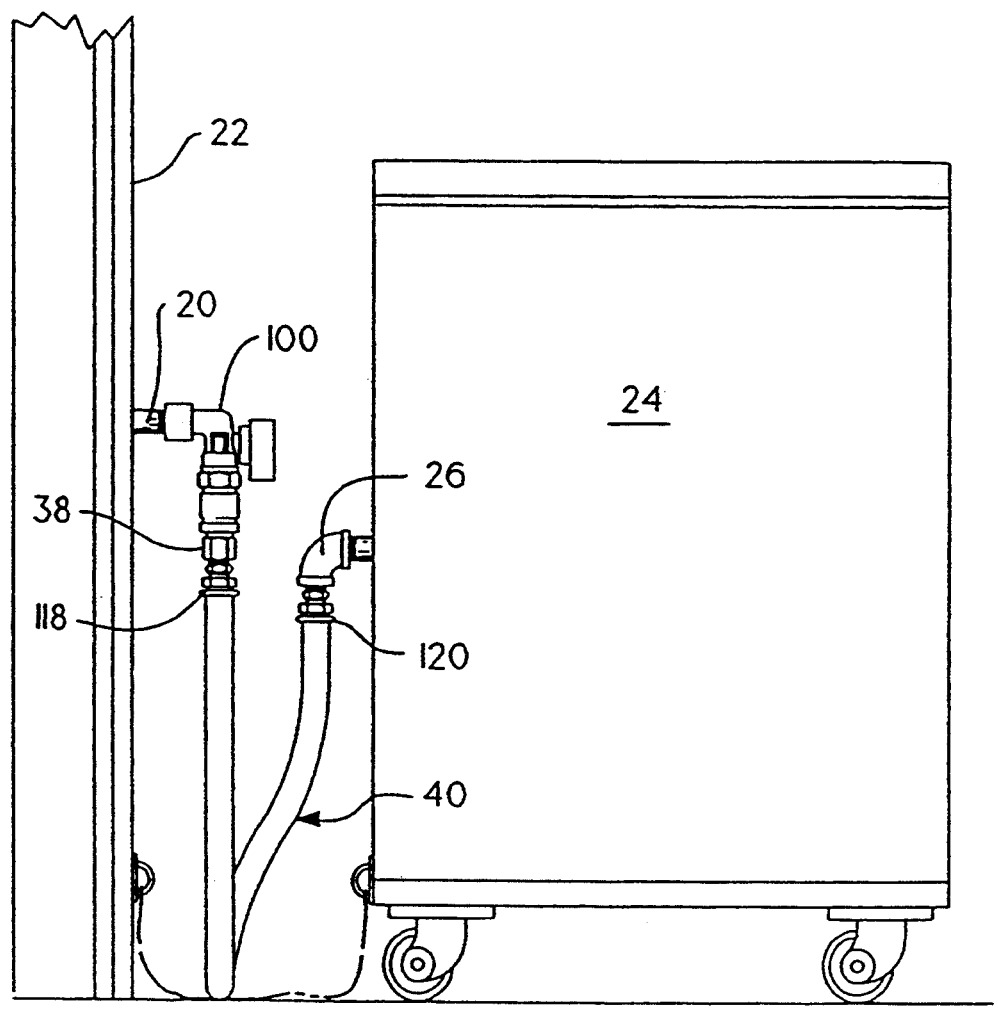
FIG. 6 is an elevational view of my presently preferred gas connector assembly used to connect a fixed gas pipe source to a gas appliance.
Figure 8:
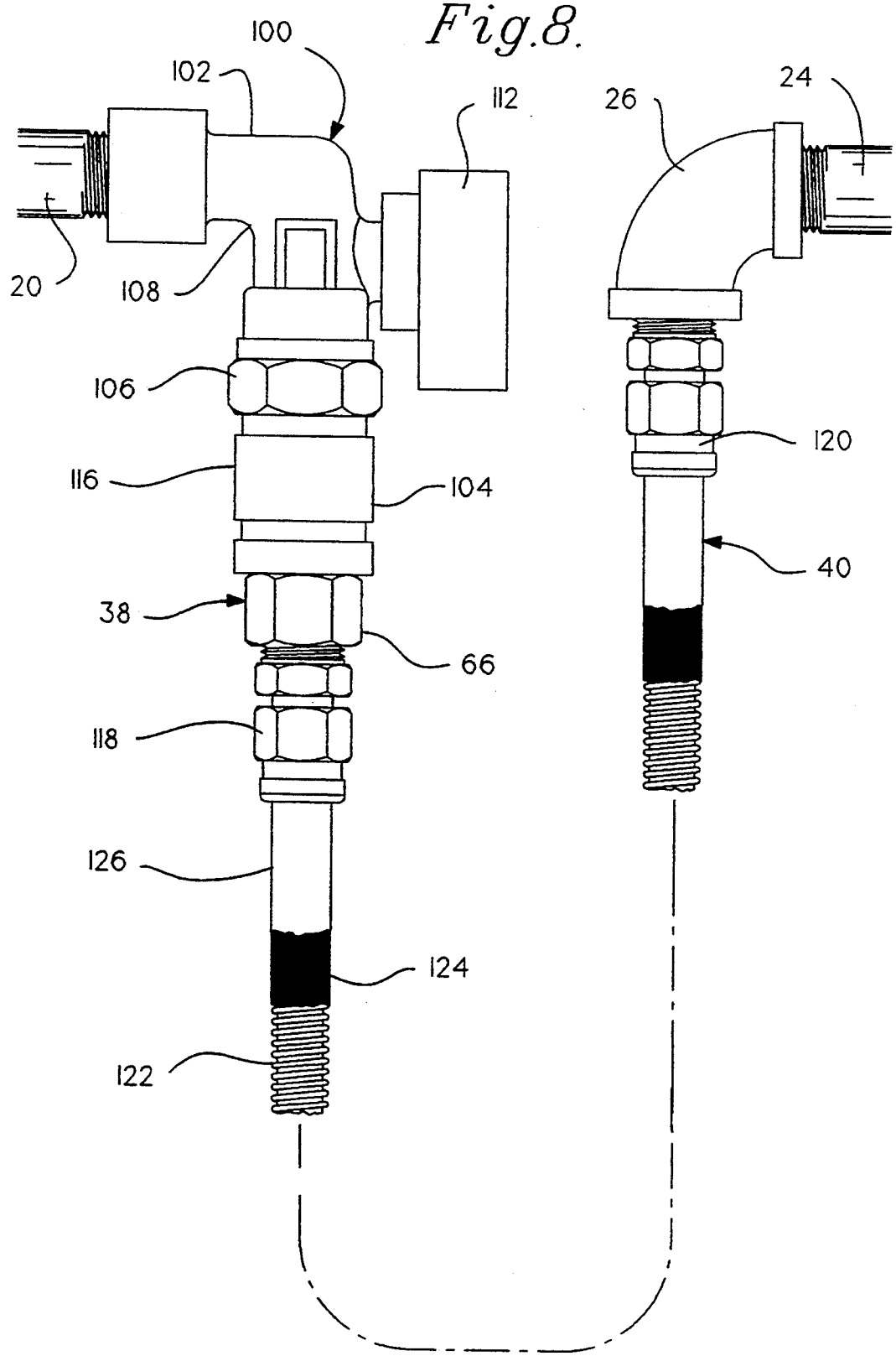
FIG. 8 is an enlarged elevational view of my presently preferred gas connector assembly shown in FIG. 6.

FIGS. 6 and 8 show an arrangement of the gas connector assembly which includes a unitary valve assembly member 100 and a flexible connector 40. The unitary valve assembly member 100 is shown in greater detail in FIGS. 16 and 17. The unitary valve assembly member 100 has a first end portion 102, a second end portion 104 and an intermediate portion 106 where the first end portion 102 is in the configuration of an elbow 108 and includes a ball valve 110 and operating means 112 for manually opening and closing the ball valve 110. Although not illustrated, the first end portion 102 can take the form of any number of shapes. The second end portion 104 includes a check valve 114 and a quick disconnect coupling 116.

The first end portion 102 of the unitary valve assembly member 100 is directly connected to the fixed pipe source 20 and the quick disconnect coupling 116 is connected to adapter plug 38. The flexible connector 40 has a first end 118 and a second end 120 where the first end 118 is connected to adapter plug female end 66 and the second end 120 is connected to the gas appliance 24 by elbow joint 26.

The flexible connector 40 (FIG. 8) is made of corrugated stainless steel tubing 122 covered by a stainless steel braid 124 which acts as a protective sheet over corrugated tubing 122. The surrounding braid 124 is coated with polyvinylchloride 126. Although illustrated in submitted formal drawings of our U.S. Pat. No. 5,178,422 to Sekerchak, the stainless steel braid is not identifiable as such therein.

Figure 7:
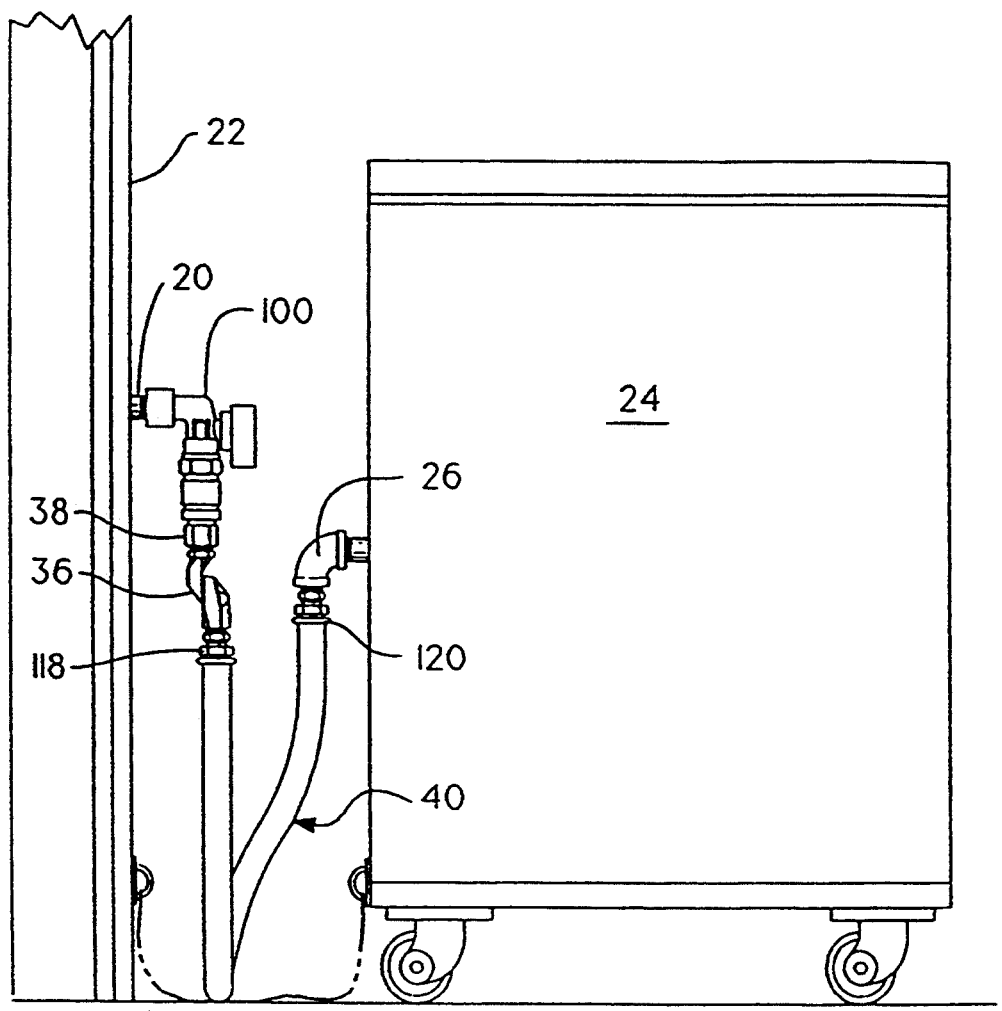
FIG. 7 is an elevational view of a second presently preferred embodiment of my gas connector assembly used to connect a fixed gas pipe source to a gas appliance.
Figure 9:
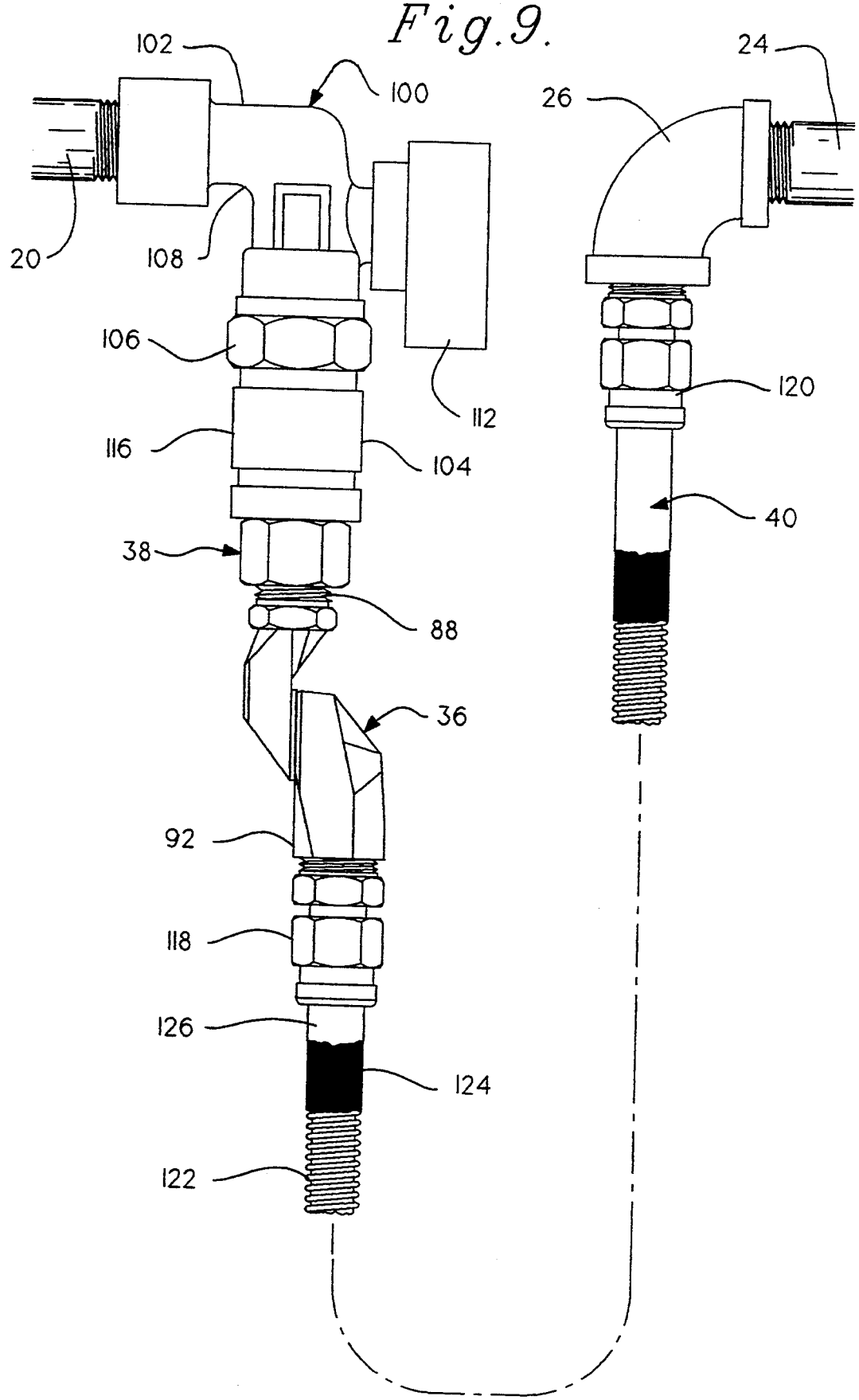
FIG. 9 is an enlarged elevational view of my second presently preferred embodiment of my gas connector assembly shown in FIG. 7.

FIGS. 7 and 9 illustrate a second gas connector assembly arrangement which includes unitary valve assembly member 100, a swivel 36 and flexible connector 40. The unitary valve assembly member 100 is connected to fixed pipe source 20 at first end portion 102 and is connected to swivel male threaded portion 88 at second end portion 104 by adapter plug 38. The swivel second body member second end 92 is coupled to flexible connector first end 118 and flexible connector second end 120 is coupled to gas appliance 24 by elbow joint 26.

Figure 10:
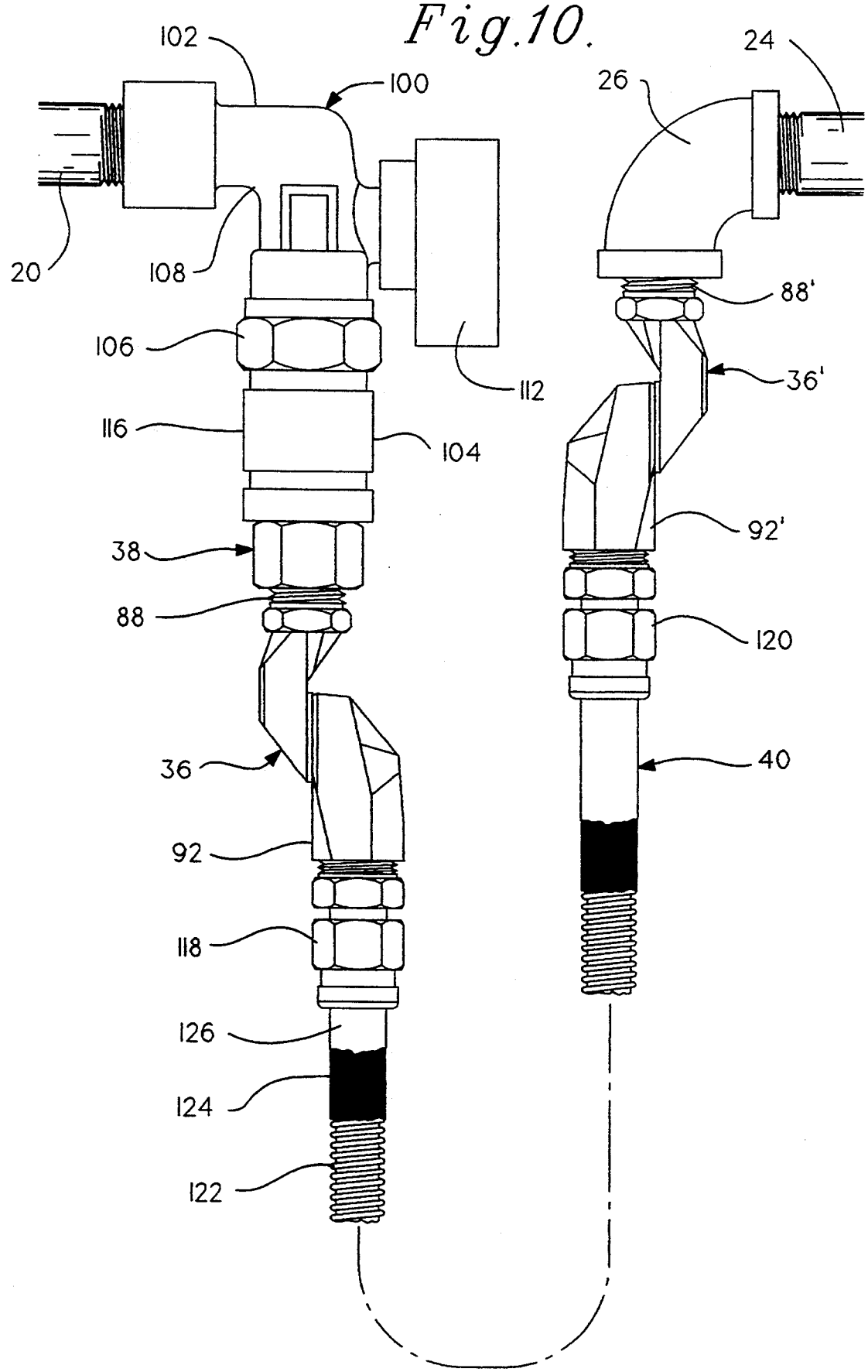
FIG. 10 is an elevational view of a third presently preferred embodiment of my gas connector assembly.

In a third embodiment shown in FIG. 10, the gas connector assembly apparatus utilizes two swivels 36, 36'. A first swivel 36 is connected at its male threaded portion 88 to the unitary valve assembly member second end portion 104 by adapter plug 38 and first swivel second body member second end 92 is connected to flexible connector first end 118. The second swivel 36' is connected between the gas appliance 24 and the flexible connector second end 120. The second swivel male threaded portion 88' is connected to gas appliance 24 by elbow joint 26 and second swivel second body member second end 92' is connected to flexible connector second end 120.

Figure 11:
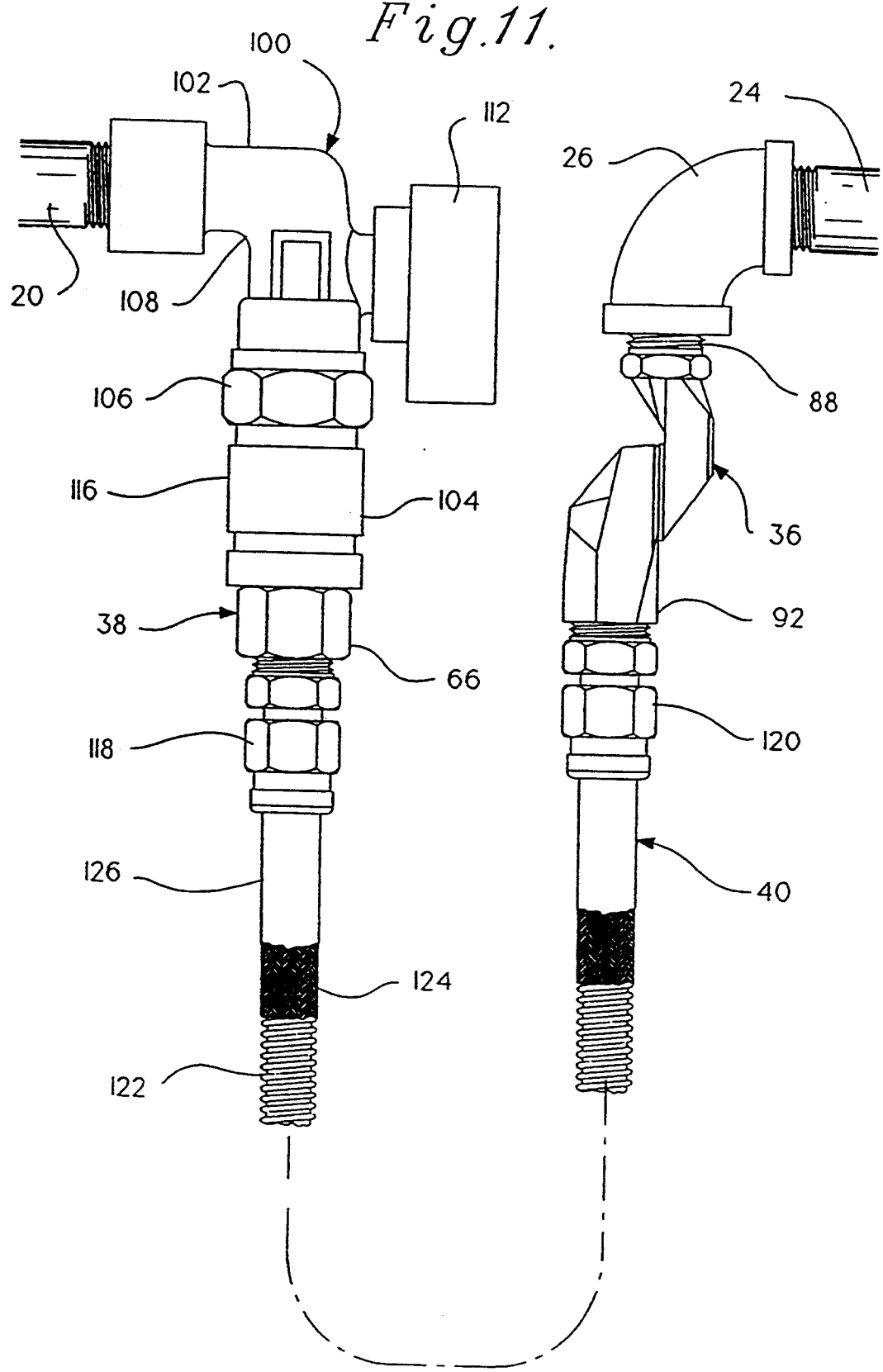
FIG. 11 is an elevational view of a fourth presently preferred embodiment of my gas connector assembly.

FIG. 11 illustrates a fourth embodiment of my gas connector assembly utilizing the unitary valve assembly member 100, flexible connector 40 and one swivel 36 positioned adjacent gas appliance 24. In this gas connector assembly, the first end 118 of flexible connector 40 is connected to the second end portion 104 of the unitary valve assembly member 100 by adapter plug 38. The second end 120 of the flexible connector 40 is connected to swivel second body member second end 92. The male threaded portion 88 of swivel 36 is connected no gas appliance 24 by elbow joint 26.

FIGS. 12 thru 15 illustrate four embodiments of the gas connector assembly apparatus which correspond to FIGS. 8 thru 11, respectively, but which incorporate a second unitary valve assembly member 128 different from that shown in FIGS. 6 thru 11. This second unitary valve assembly member 128 is similar to that disclosed in U.S. Pat. No. 5,172,723 to Sturgis and is shown in greater detail in FIGS. 18 and 19.

Just as the unitary valve assembly members 100 shown in FIGS. 6 thru 11 are all directly connected to fixed source pipe 20 so too are the second unitary valve assembly members 128 shown in FIGS. 12 thru 15.

Figure 12:
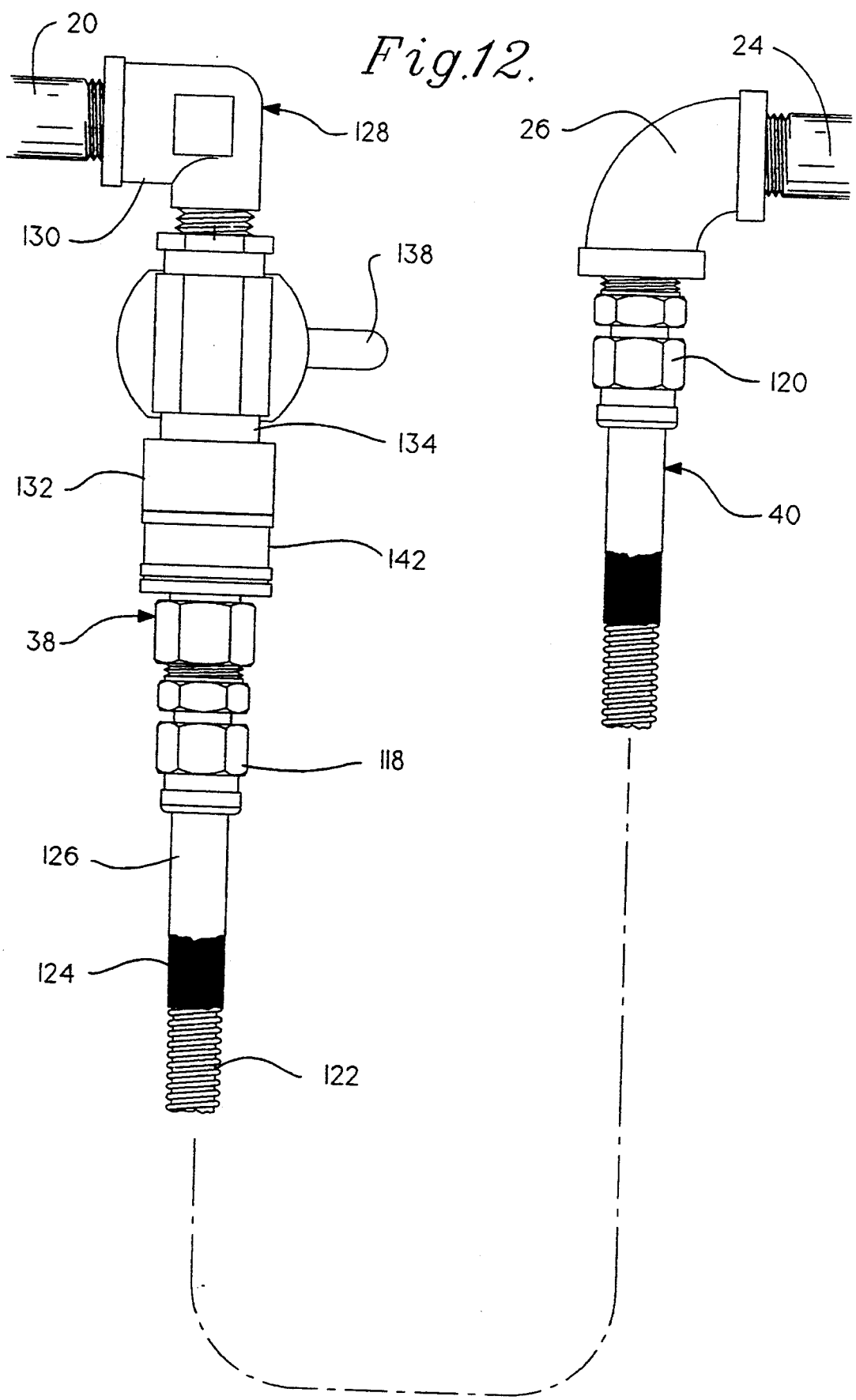
FIG. 12 is an elevational view similar to the arrangement of FIG. 8 of my presently preferred gas connector assembly utilizing a second presently preferred embodiment of a unitary valve assembly member.
Figure 18:
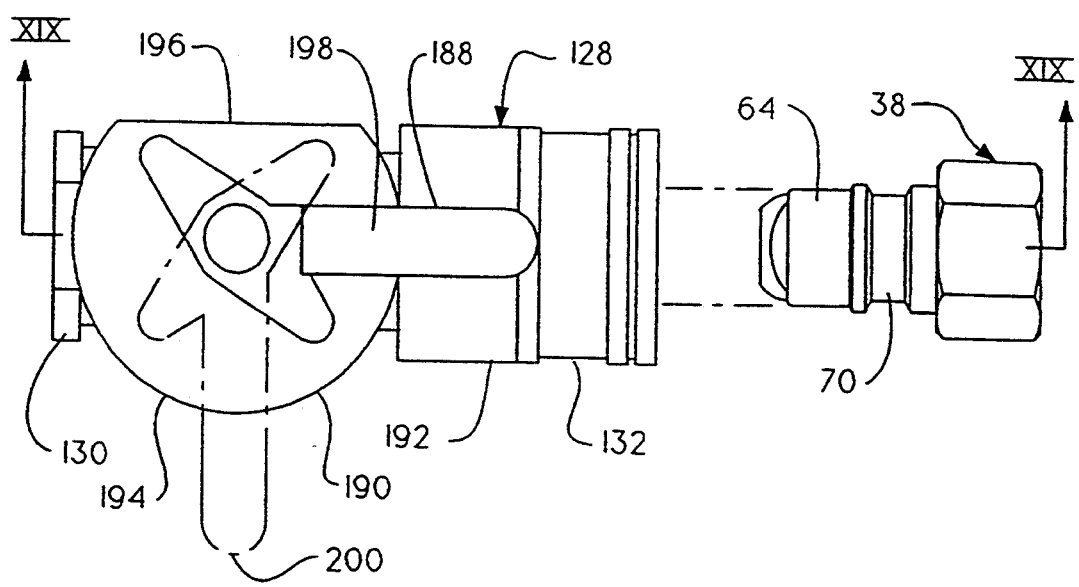
FIG. 18 is an elevational view of the second presently preferred embodiment of the unitary valve assembly member shown in FIGS. 12 thru 15.
Figure 19:
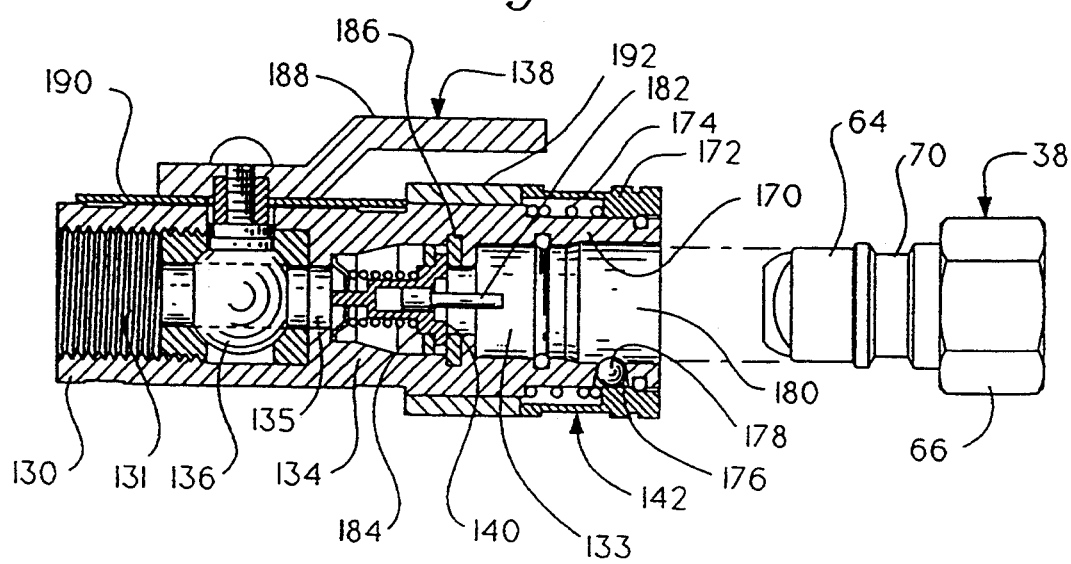
FIG. 19 is a partial transverse sectional view of the unitary valve assembly member shown in FIG. 18 taken along line XIX—XIX.

FIGS. 12, 18 and 19 shows the second unitary valve assembly member 128 including a first end portion 130, a second end portion 132 and an intermediate portion 134 positioned therebetween and each portion including an axial bore 131, 133, and 135, respectively, extending therewithin (FIG. 19). The first end portion 130 includes a ball valve 136 having operating means 138 for manually positioning the ball valve 136 in an open position or a closed position. The unitary valve assembly member 128 includes a check valve 140 shown in FIG. 19. The second end portion 132 includes a quick disconnect coupling 142. The second unitary valve assembly member first end portion 130 is directly connected to the fixed source pipe 20. The second unitary valve assembly member second end portion 132 is connected to flexible connector first end 118 by adapter plug 38. The flexible connector second end 120 is connected to the gas appliance 24 by elbow joint 26.

Figure 13:
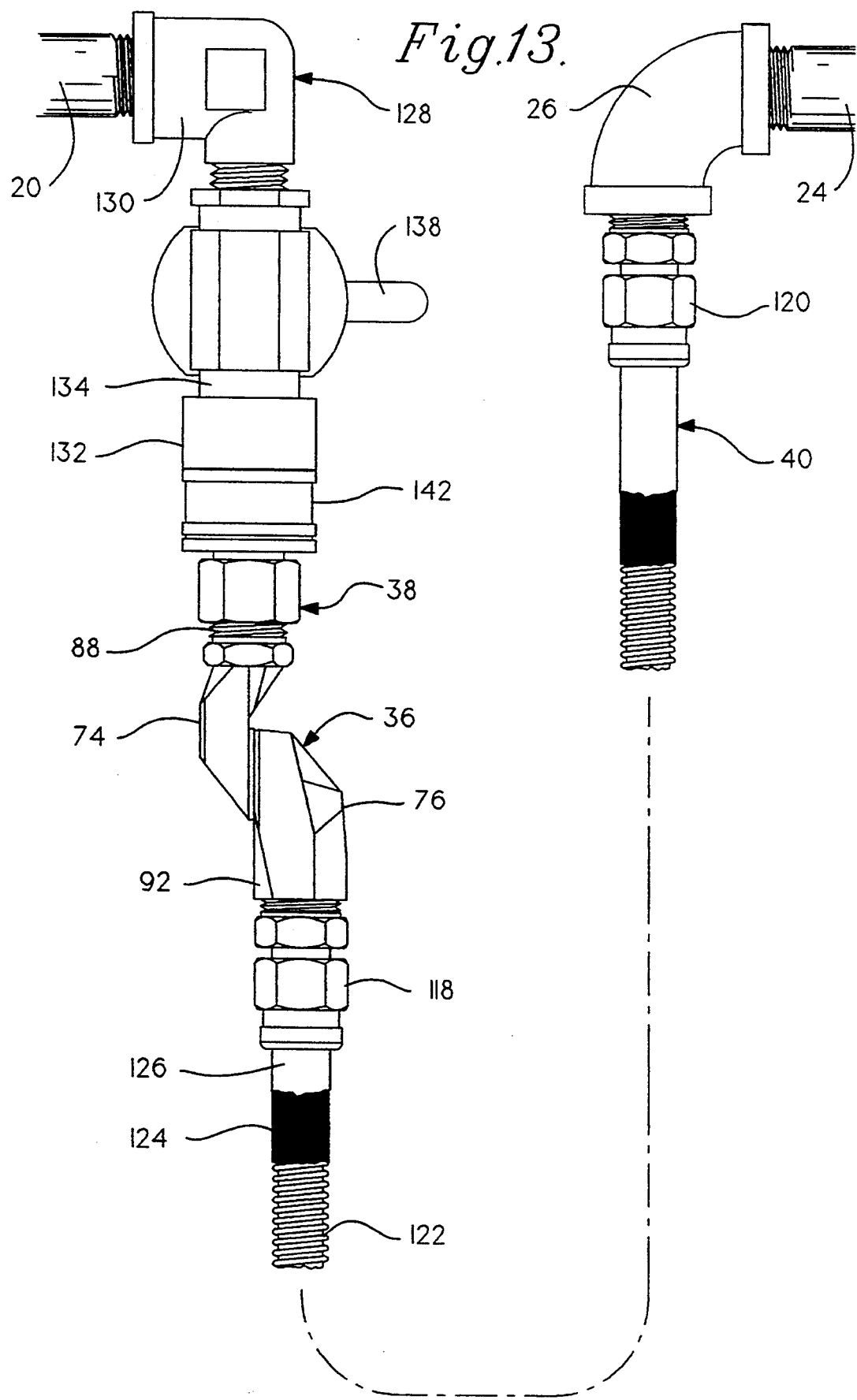
FIG. 13 is an elevational view similar to the arrangement of FIG. 9 of my gas connector assembly utilizing the second presently preferred embodiment of the unitary valve assembly member.

FIG. 13 shows a second presently preferred embodiment of my gas connector assembly utilizing the second unitary valve member 128. The second unitary valve assembly member first end portion 130 is directly connected to the fixed pipe source 20. The second unitary valve assembly member second end portion 132 is connected to the male threaded portion 88 of swivel 36 by adapter plug 38. The flexible connector first end 118 is threadably connected to second end 92 of the swivel second body member 76. The flexible connector second end 120 is connected to the gas appliance 24 by elbow joint 26.

Figure 14:
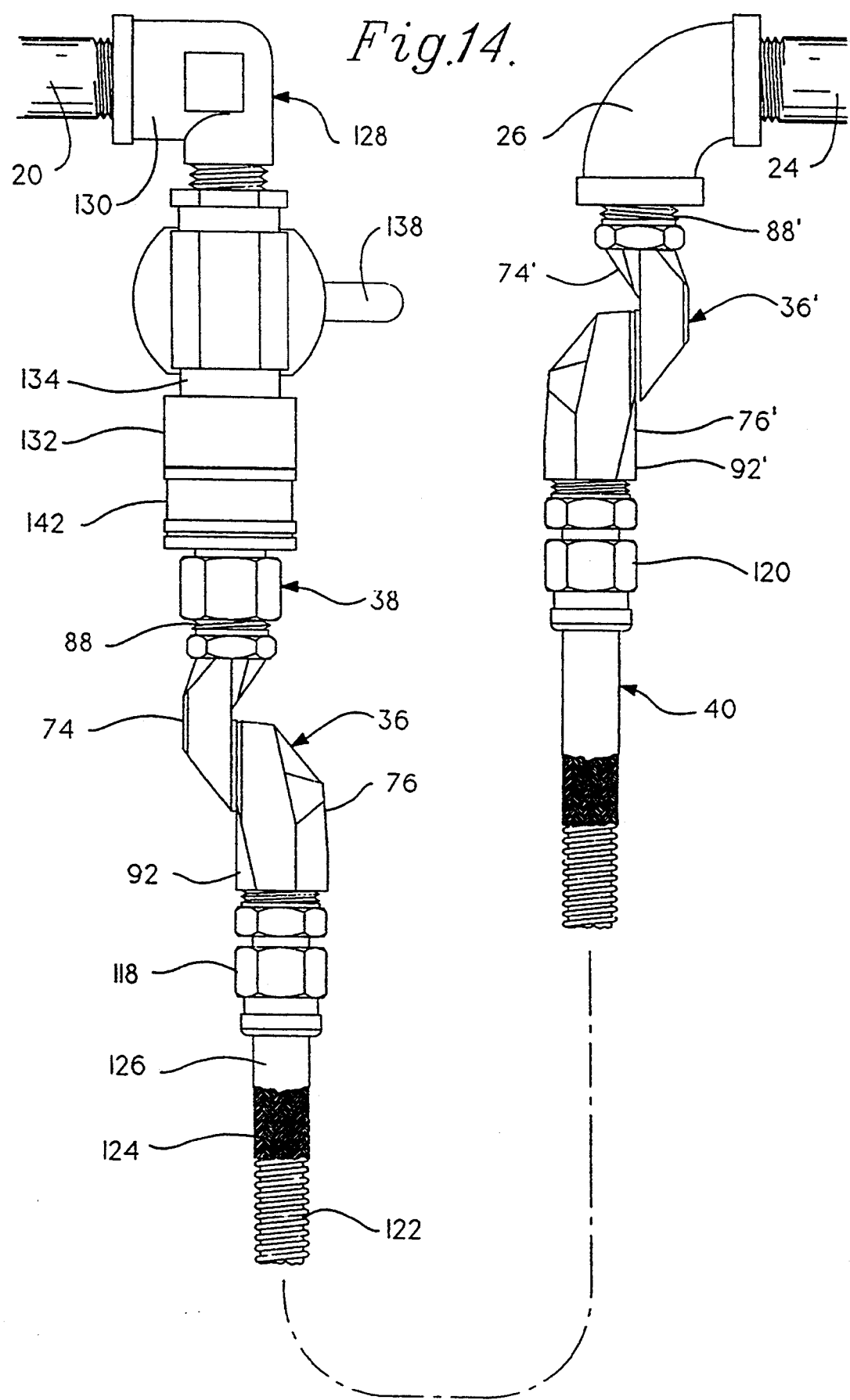
FIG. 14 is an elevational view similar to the arrangement of FIG. 10 of my gas connector assembly utilizing the second presently preferred embodiment of the unitary valve assembly member.

FIG. 14 illustrates a third gas connector assembly arrangement utilizing two swivels 36, 36' with first swivel male threaded portion 88 connected to second unitary valve assembly member second end portion 132 by adapter plug 38 and second swivel male threaded portion 88' connected to gas appliance 24 by elbow joint 26. Swivel second body member second ends 92, 92' are connected to first end 118 and second end 120 of flexible connector 40, respectively.

Figure 15:
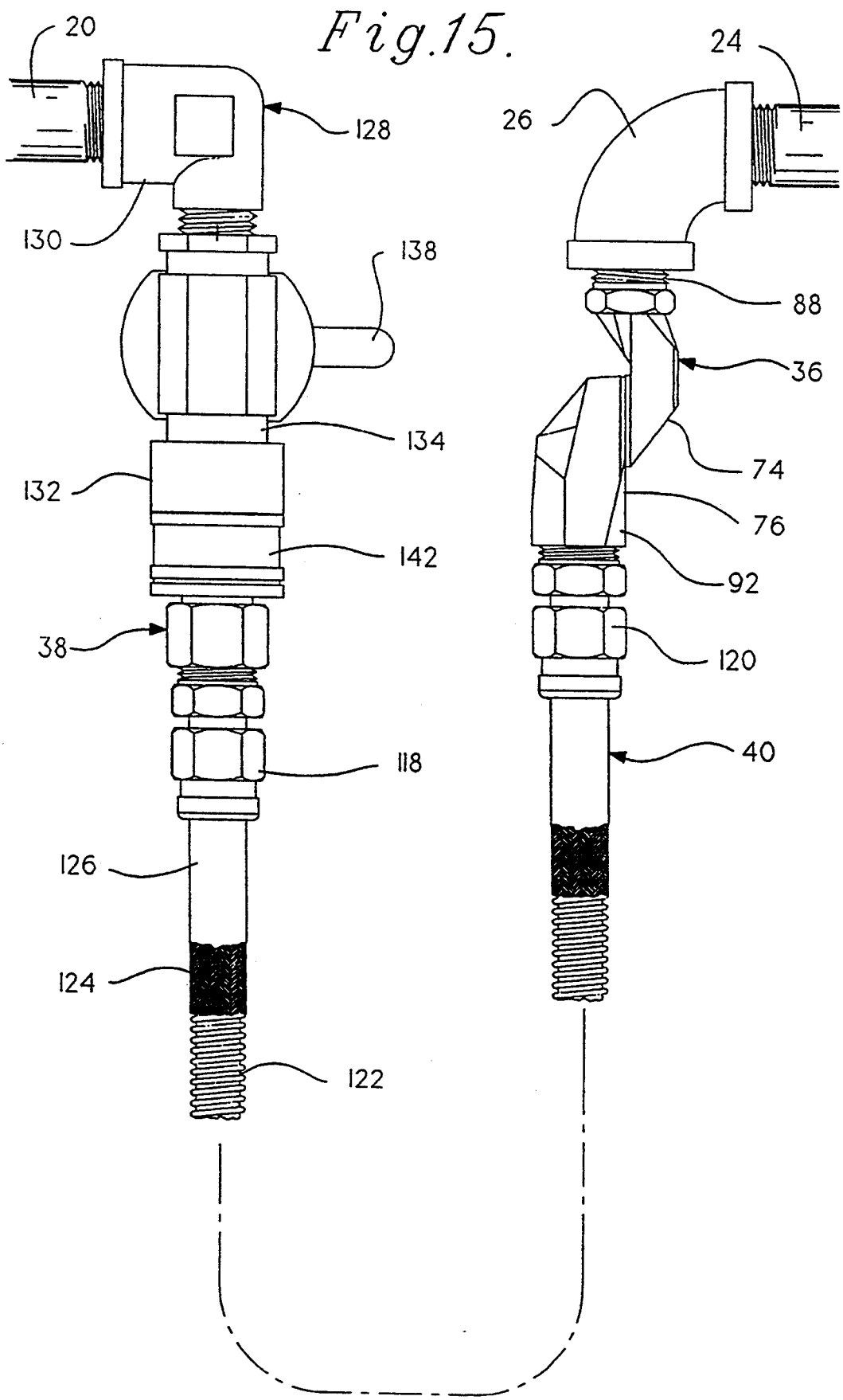
FIG. 15 is an elevational view similar to the arrangement of FIG. 11 of my gas connector assembly utilizing the second presently preferred embodiment of the unitary valve assembly member.

FIG. 15 shows a fourth gas connector assembly arrangement utilizing only one swivel 36. The swivel male threaded portion 88 is connected to gas appliance 24 by elbow joint 26. The swivel second body second end 92 is connected to the second end 120 of flexible connector 40. The flexible connector first end 118 is connected to second end portion 132 of the second unitary valve assembly member 128 by adapter plug 38.

Figure 16:
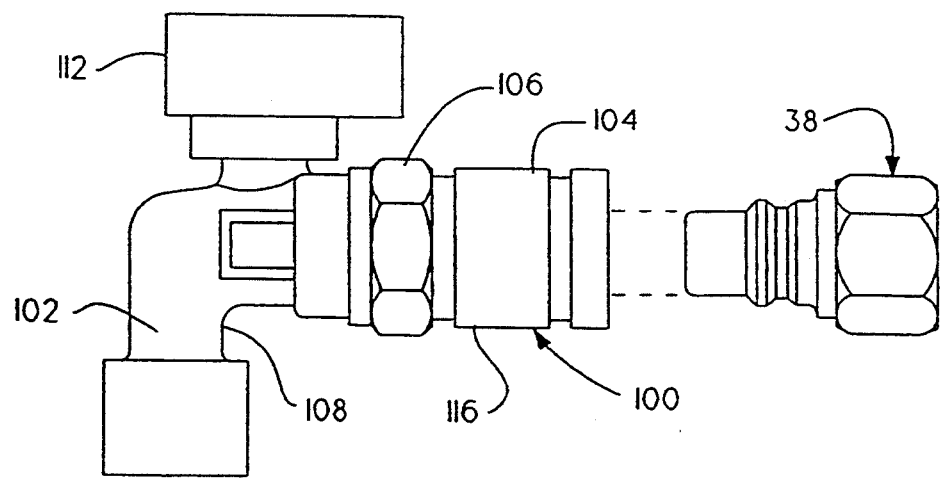
FIG. 16 is an elevational view of the unitary valve assembly member shown in FIGS. 6 thru 11.
Figure 17:
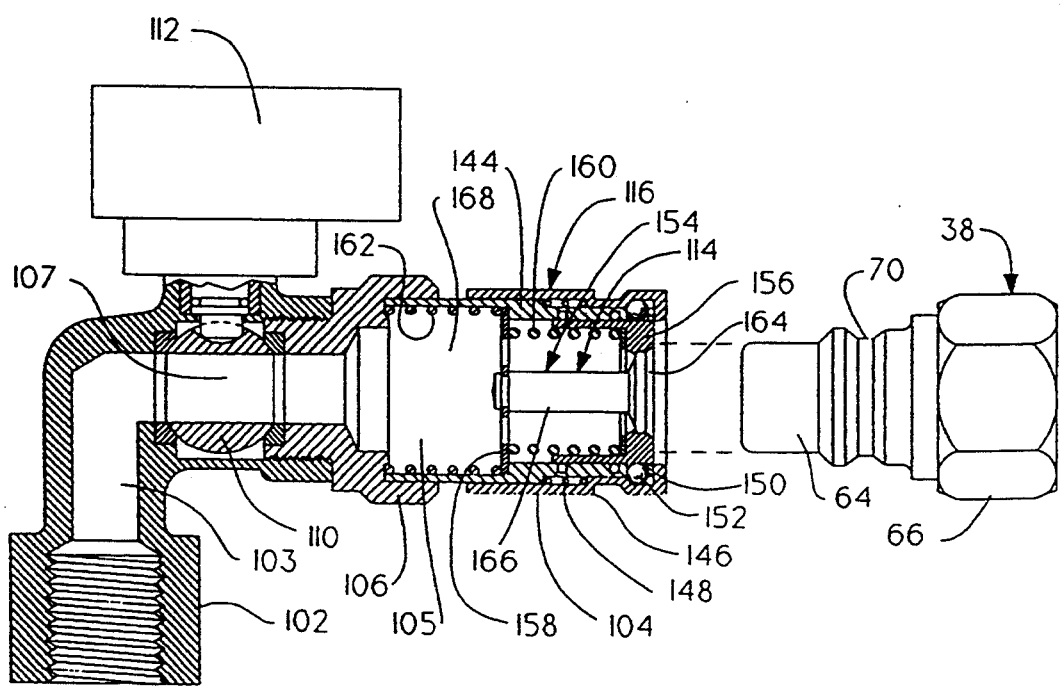
FIG. 17 is an enlarged partial transverse sectional view of the unitary valve assembly member shown in FIG. 16.

FIGS. 16 and 17 illustrate unitary valve assembly member 100 utilized in the gas connector assemblies shown in FIGS. 6 thru 11. The unitary valve assembly member 100 has a first end portion 102, a second end portion 104 and an intermediate portion 106 where the first end portion 102 includes an elbow configuration 108, a ball valve 110 and operating means 112 for manually opening and closing the ball valve 110. The intermediate portion 106 is positioned between first end portion 102 and second end portion 104. Second end portion 104 includes a check valve 114 and a quick disconnect coupling 116.

The first end portion 102 is threadably connected to the intermediate portion 106 and may be sealed with a bonding agent in order that first end portion 102 and intermediate portion 106 cannot be separated without the use of tools or heat after they are assembled. The bonding agent can be applied to the threaded connection of first end portion 102 and intermediate portion 106 during the manufacturing of the unitary valve assembly member 100. The intermediate portion 106 and second end portion 104 are connected such that they too cannot be dismantled after being assembled during manufacturing of the unitary valve assembly member 100. Hence, the unitary valve assembly member 100 is a unitary construction. The unitary valve assembly member 100 can be made in a one piece construction.

The second end portion 104 includes quick disconnect coupling 116 having an inner cylindrical member 144 and an outer sliding ring 146 with a first spring 148 positioned therebetween. The quick disconnect coupling 116 includes apertures 150 positioned around the circumference of the inner cylindrical member 144 and in which ball bearings 152 are located.

Check valve 114 comprises a valve 154, a valve seat 156, a divider 158, a second spring 160 and a third spring 162. The valve 154 includes a valve head 164 and a valve stem 166. The quick disconnect coupling 116 and check valve 114 work in concert in the following manner. When male end 64 of adapter plug 38 is inserted within axial bore 168 of inner cylindrical member 144 the adapter plug male end 64 contacts valve seat 156 and forces valve seat 156 in the direction of first end portion 102 such that both springs 160, 162 are compressed. Adapter plug 38 is inserted within inner cylindrical member 144 until adapter plug detent 70 is in engagement with ball bearings 152. At this point valve 154 is unseated from valve seat 156 maintaining an open position such that the natural gas or liquid propane from the fixed pipe source 20 can flow through the axial bore 103 of the first end portion 102 to the second end portion axial bore 105. The sliding ring 146 does not need to be manipulated prior to the insertion of adapter plug 38 within quick disconnect coupling 116. Adapter plug 38 is inserted within the quick disconnect coupling 116 in one motion making the connection of adapter plug 38 and unitary valve assembly member 100 relatively uncomplex.

FIGS. 18 and 19 illustrate the second unitary valve assembly member 128 utilized in the gas connector assemblies shown in FIGS. 12 thru 15. The second unitary valve assembly member shown in both FIGS. 18 and 19 does not illustrate the elbow configuration shown in FIGS. 12 thru 15 in order to simplify FIGS. 18 and 19. The first end portion 130 includes a ball valve 136 having operating means 138 for manually positioning the ball valve 136 in an open position or a closed position. The operating means 138 can take the form of a shut-off handle as shown in FIG. 18. Check valve 140 is shown as a Shraeder valve in FIG. 19. The second end portion 132 includes a quick disconnect coupling 142 having an inner cylindrical member 170, an outer sliding ring 172 and a spring 174 positioned therebetween. The cylindrical member 170 includes aperture 176 positioned therein in which bearings 178 are located. Outer sliding ring 172 is manually slid in the direction of first end portion 130 and then adapter plug 38 is inserted within axial bore 133 of the second end portion 132 until adapter plug detent 70 is in engagement with ball bearings 178. Once the sliding ring 172 returns to its initial position shown in FIGS. 18 and 19 adapter plug 38 is locked in engagement with quick disconnect coupling 142. Further, when the adapter plug male end 64 is inserted within the axial bore 133 of the second end portion 132, the adapter plug 38 will force valve stem 182 in the direction of first end portion 130, thus disengaging valve head 184 from the valve seal 186 and positioning check valve 140 in an open position such that natural gas can flow through first end portion axial bore 131, through intermediate portion axial bore 135 and then through second end portion axial bore 133.

The operating means 138 of the second unitary valve assembly member 128 prevents quick disconnect coupling 142 from disengaging from adapter plug 38 before ball valve 136 is in a closed position. For a detailed description of operating means 138 shown in FIGS. 12 thru 15, 18 and 19 see column 4, line 31 thru column 5, line 31 of U.S. Pat. No. 5,172,723 (Sturgis) which is incorporated herein by reference. Operating means 138 include a lever 188 fixedly attached to a plate 190. Operating means 138 further includes second ring 192. Plate 190 has a rounded edge 194 and a flat edge 196. Lever 188 can move between a first position 198 and a second position 200 which correspond to ball valve 136 being in an open position and a closed position, respectively. When lever 188 is in first position 198 ball valve 136 is opened and quick disconnect coupling 142 cannot be disengaged from adapter plug 38. Specifically, sliding ring 172 is prevented from moving in the direction of second unitary valve assembly member first end portion 130 by plate rounded edge 194 which contacts and holds second ring 192 against sliding ring 172. When lever 188 is in second position 200, ball valve 136 is closed and quick disconnect coupling 142 is able to be disengaged from adapter plug 38. Plate flat edge 196 is positioned adjacent but not in contact with second ring 192. Second ring 192 and sliding ring 172 are able to move in the direction of the first end portion 130 allowing adapter plug 38 to be disengaged from quick disconnect coupling 142.

The second unitary valve assembly member 128 includes a temperature sensitive means. Temperature sensitive means is described in detail in column 5, line 32 through column 6, line 14 of U. S. Pat. No. 5,172,723 herein incorporated by reference. Valve stem 182 is connected to valve head 184 with a temperature sensitive bond (not shown) which is broken once a predetermined temperature is reached. Once the predetermined temperature is reached, valve stem 182 no longer holds the valve head 184 in an open position. The valve stem 182 will move in the direction of the second end portion 132 within valve head 184. The valve head 184 then is positioned against the valve seat 186 in a closed position. The unitary valve assembly member check valve 114 shown in FIGS. 16 and 17 can also incorporate a temperature sensitive device which closes the check valve 114 when a predetermined temperature is reached similar to that described above.

Figure 20:
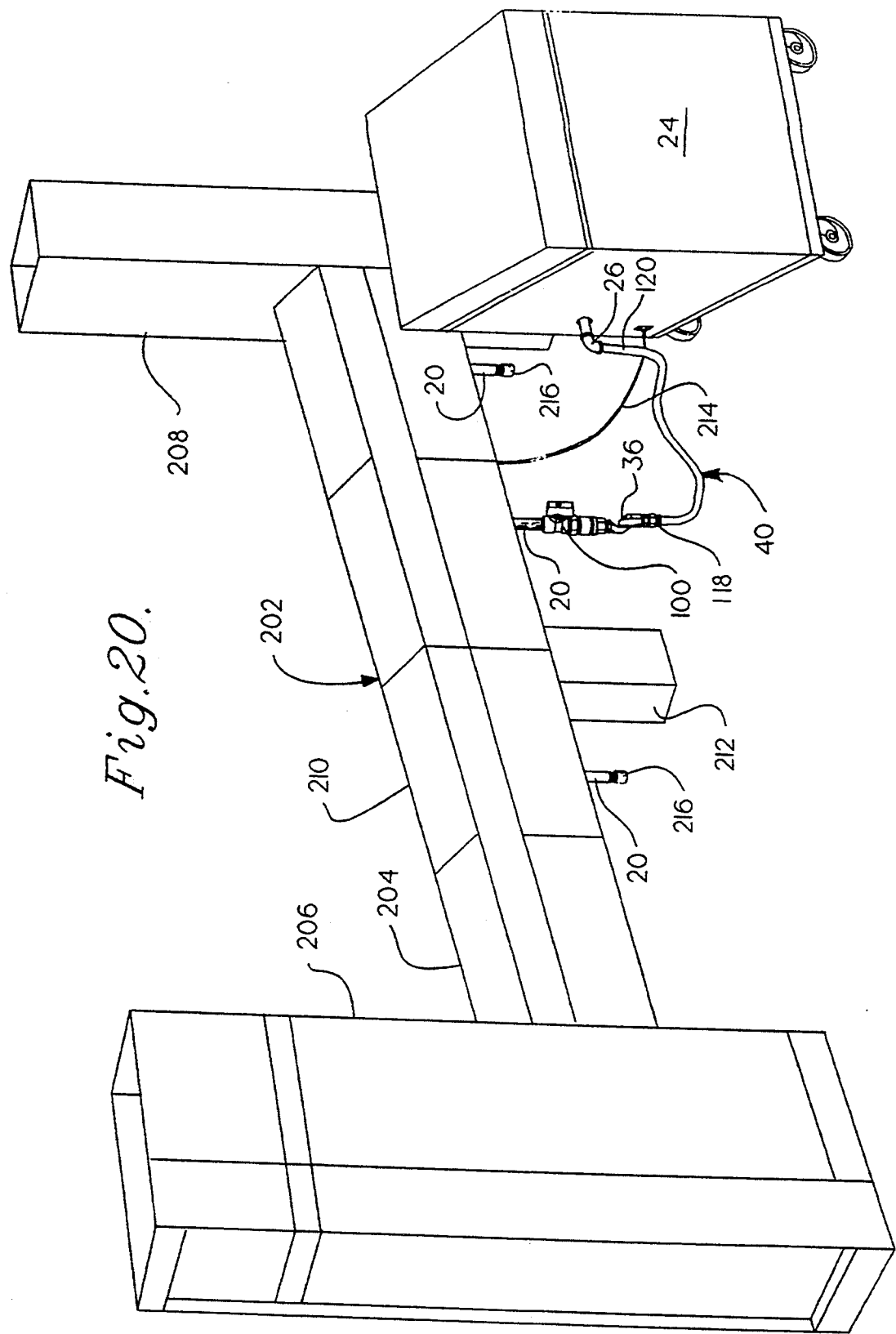
FIG. 20 is an isometric view of my gas connector assembly connecting a fixed gas pipe source mounted in a utility distribution system and an appliance.

FIG. 20 illustrates my gas connector assembly substantially shown in FIG. 9 connecting appliance 24 to a fixed gas pipe source 20 mounted in a utility distribution system 202. Utility distribution system 202 takes the form of an island configuration and includes an exterior housing 204 comprising a primary riser 206, a secondary riser 208, a raceway 210 and a pedestal support 212. The primary riser 206 serves as a single point connection for main supply lines of utilities (not shown) such as gas, electric, hot and cold water, and steam. The main supply lines can extend along floors or ceilings of a room and then enter the primary riser 206. The main supply lines then extend from primary riser 206 into raceway 210 where main supply lines provide multiple utility connections extending along both sides of raceway 210. Multiple gas fixed pipe gas sources 20, multiple electrical power supply cords 214, as well as multiple cold water and hot water supply lines (not shown) and multiple steam supply lines (not shown) may extend from raceway 210 in order to supply utilities to appliance 24. Utility distribution system 202 can be positioned in the center of the room such that appliances can be connected to utilities from both sides of the utility distribution system raceway 210. Although utility distribution system 202 is shown as an island configuration it can take many forms such as, a wall-mount configuration, a ceiling-mount configuration, or a tray slide/counter configuration.

One of the multiple fixed gas pipe sources 20 is shown in FIG. 20 being connected to one end of unitary valve assembly member 100 illustrated in greater detail in FIGS. 16 and 17. The other end of unitary valve assembly member 100 is connected to swivel 36 which is connected to connector first end 118. Connector second end 120 is threadably connected to appliance 24 by elbow 26. When fixed gas pipe source 20 is not connected to a gas connector assembly fixed gas pipe source is closed with a cap 216.

Figure 21:
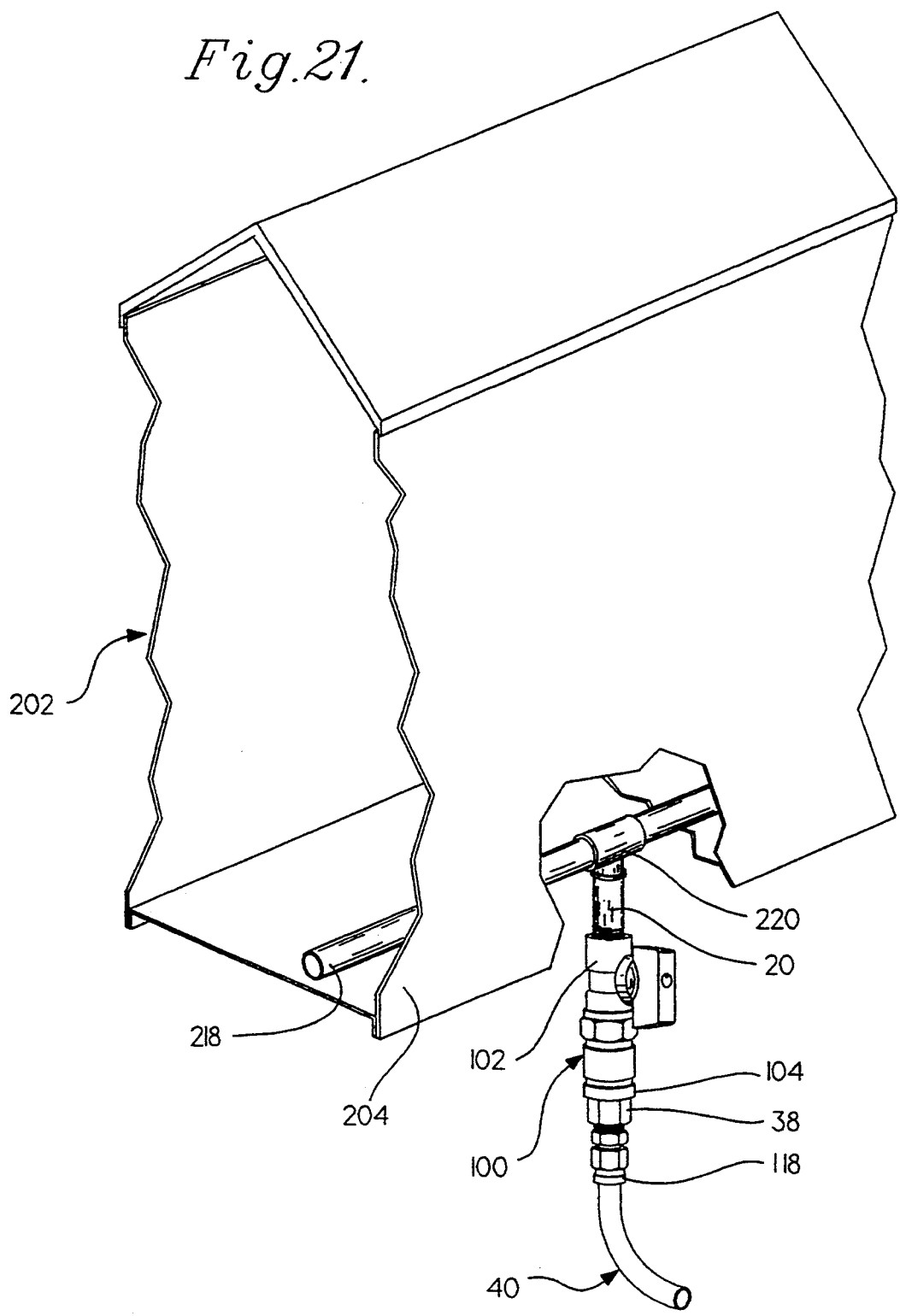
FIG. 21 is an isometric view of a fixed gas pipe source mounted in a cutaway section of a utility distribution system and connected to a unitary valve assembly member similar to the unitary valve assembly member shown in FIGS. 16 and 17.

FIG. 21 illustrates in greater detail the connection of the unitary valve assembly member 100 to one of the multiple fixed gas pipe sources 20 mounted in utility distribution system housing 204. The main gas supply line 218 is connected no fixed gas pipe source 20 using a tee joint 220. Fixed gas pipe source 20 is threadably connected to unitary valve assembly member first end portion 102. The unitary valve assembly member first end portion takes the form of a straight pipe having a female threaded connection as opposed to elbow configuration 108 shown in FIGS. 16 and 17. Unitary valve assembly member second end portion 104 is connected to the first end 118 of connector 40 by adapter 38. As illustrated in FIG. 21 a swivel does not have to be utilized in the connection between multiple fixed gas pipe sources 20 mounted in utility distribution system 202 and appliance 24. Further, although not shown the gas connector assemblies illustrated in FIGS. 6 through 15 can also be utilized to connect fixed gas pipe source 20 mounted in utility distribution system 202 to appliance 24.

The gas connector assembly apparatus for delivering natural gas or liquid propane from a fixed source to a gas appliance described herein is preferably utilized in a commercial food service environment. The gas connector assembly can also be utilized when it is necessary for disconnecting the apparatus in a fast, uncomplicated manner in which the unitary valve can only be installed in one manner and cannot be installed improperly.

While I have described presently preferred embodiments of the invention it is to be distinctly understood that the invention is not limited thereto, but may be otherwise embodied and practiced within the scope of the following claims.

I claim:

1. An apparatus for delivering natural gas or liquid propane under pressure from a fixed gas source to a gas appliance, the gas appliance being mounted on casters and being movable to and away from the fixed gas source, the apparatus comprising:
   a) a unitary valve assembly member having a first end portion and a second end portion, the first end portion being directly connected to the fixed gas source, the unitary valve assembly member further comprising:
      i) a ball valve being located at the first end portion;
      ii) operating means being located at the first end portion and being positioned on an exterior surface of the unitary valve assembly member, the operating means for manually moving the ball valve from an open positioned to a closed position where the ball valve in the open position allows the natural gas or liquid propane to flow through the ball valve and the ball valve in the closed position prevents the natural gas or liquid propane from flowing through the ball valve;
      iii) a check valve being located at the second end portion; and
      iv) a quick disconnect coupling being located at the second end portion; and
   b) a connector having a first end and a second end, the connector first end being connected to the unitary valve assembly member second end portion, the connector second end being connected to the gas appliance.

2. The apparatus of claim 1 wherein the unitary valve assembly member check valve includes temperature sensitive means for closing the check valve when a predetermined temperature is reached thus preventing flow of the natural gas or liquid propane through the unitary valve assembly member.

3. The apparatus of claim 1 wherein the connector is a flexible corrugated tubing and the tubing is covered with metal braid.

4. The apparatus of claim 3 wherein the metal braid is coated with plastic.

5. The apparatus of claim 1 further comprising an adapter plug having a first end and a second end, the adapter plug first end being connected to the unitary valve assembly member second end portion and the adapter plug second end being connected to the connector first end.

6. The apparatus of claim 5 wherein the operating means further includes means for preventing the quick disconnect coupling from disengaging from the adapter plug before the ball valve is in the closed position.

7. An apparatus for delivering natural gas or liquid propane under pressure from a fixed gas source to a gas appliance, the gas appliance being mounted on casters and being movable to and away from the fixed gas source, the apparatus comprising:
   a) a unitary valve assembly member having a first end portion and a second end portion, the first end portion being directly connected to the fixed gas source, the unitary valve assembly member further comprising:
      i) a ball valve being located at the first end portion;
      ii) operating means being located at the first end portion and being positioned on an exterior surface of the unitary valve assembly member, the operating means for manually moving the ball valve from an open positioned to a closed position where the ball valve in the open position allows the natural gas or liquid propane to flow through the ball valve and the ball valve in the closed position prevents the natural gas or liquid propane from flowing through the ball valve;
      iii) a check valve being located at the second end portion; and
      iv) a quick disconnect coupling being located at the second end portion;
   b) a connector having a first end and a second end, the connector second end being connected to the gas appliance; and
   c) a swivel having:
      i) a first body member including a first end and a second end;
      ii) means for rotatably coupling the first body member first end to the unitary valve assembly member second end portion, the first body member being rotatable about a fixed first axis with respect to the rotatable coupling means; and
      iii) a second body member having a first end and a second end, the second body member first end being rotatably coupled to the first body member second end, the second body member first end being rotatable about a second axis which intersects the fixed first axis, the second body member having a third axis at the second end thereof, the third axis being parallel to and rotatable about the fixed first axis, the third axis intersecting the second axis, the second body member second end being connected to the connector first end.

8. The apparatus of claim 7 wherein the unitary valve assembly member check valve includes temperature sensitive means for closing the check valve when a predetermined temperature is reached thus preventing flow of the natural gas or liquid propane through the unitary valve assembly member.

9. The apparatus of claim 7 wherein the connector is a flexible corrugated tubing and the tubing is covered with metal braid.

10. The apparatus of claim 9 wherein the metal braid is coated with plastic.

11. The apparatus of claim 7 further comprising an adapter plug having a first end and a second end, the adapter plug first end being connected to the unitary valve assembly member second end portion and the adapter plug second end being connected to the swivel rotatable coupling means.

12. The apparatus of claim 11 wherein the operating means further includes means for preventing the quick disconnect coupling from disengaging from the adapter plug before the ball valve is in the closed position.

13. An apparatus for delivering natural gas or liquid propane under pressure from a fixed gas source to a gas appliance, the gas appliance being mounted on casters and being movable to and away from the fixed gas source, the apparatus comprising:
   a) a unitary valve assembly member having a first end portion and a second end portion, the first end portion being directly connected to the fixed gas source, the unitary valve assembly member further comprising:
      i) a ball valve being located at the first end portion;
      ii) operating means being located at the first end portion and being positioned on an exterior surface of the unitary valve assembly member, the operating means for manually moving the ball valve from an open positioned to a closed position where the ball valve in the open position allows the natural gas or liquid propane to flow through the ball valve and the ball valve in the closed position prevents the natural gas or liquid propane from flowing through the ball valve;
      iii) a check valve being located at the second end portion; and
      iv) a quick disconnect coupling being located at the second end portion;
   b) a connector having a first end and a second end;
   c) a swivel having:
      i) a first body member including a first end and a second end;
      ii) means for rotatably coupling the first body member first end to the unitary valve assembly member second end portion, the first body member being rotatable about a fixed first axis with respect to the rotatable coupling means; and
      iii) a second body member having a first end and a second end, the second body member first end being rotatably coupled to the first body member second end, the second body member first end being rotatable about a second axis which intersects the fixed first axis, the second body member having a third axis at the second end thereof, the third axis being parallel to and rotatable about the fixed first axis, the third axis intersecting the second axis, the second body member second end being connected to the connector first end; and
   d) a second swivel having:
      i) a first body member including a first end and a second end;
      ii) means for rotatably coupling the first body member first end to the gas appliance, the first body member being rotatable about a fixed fourth axis with respect to the rotatable coupling means; and
      iii) a second body member having a first end and a second end, the second body member first end being rotatably coupled to the first body member second end, the second body member first end being rotatable about a fifth axis which intersects the fixed fourth axis, the second body member having a sixth axis at the second end thereof, the sixth axis being parallel to and rotatable about the fixed fourth axis, the sixth axis intersecting the fifth axis, the second body member second end being connected to the connector second end.

14. The apparatus of claim 13 wherein the unitary valve assembly member check valve includes temperature sensitive means for closing the check valve when a predetermined temperature is reached thus preventing flow of the natural gas or liquid propane through the unitary valve assembly member.

15. The apparatus of claim 13 wherein the connector is a flexible corrugated tubing and the tubing is covered with metal braid.

16. The apparatus of claim 15 wherein the metal braid is coated with plastic.

17. The apparatus of claim 13 further comprising an adapter plug having a first end and a second end, the adapter plug first end being connected to the unitary valve assembly member second end portion and the adapter plug second end being connected to the swivel rotatable coupling means.

18. The apparatus of claim 17 wherein the operating means further includes means for preventing the quick disconnect coupling from disengaging from the adapter plug before the ball valve is in the closed position.

19. An apparatus for delivering natural gas or liquid propane under pressure from a fixed gas source to a gas appliance, the gas appliance being mounted on casters and being movable to and away from the fixed gas source, the apparatus comprising:
 a) a unitary valve assembly member having a first end portion and a second end portion, the first end portion being directly connected to the fixed gas source, the unitary valve assembly member further comprising:
  i) a ball valve being located at the first end portion;
  ii) operating means being located at the first end portion and being positioned on an exterior surface of the unitary valve assembly member, the operating means for manually moving the ball valve from an open positioned to a closed position where the ball valve in the open position allows the natural gas or liquid propane to flow through the ball valve and the ball valve in the closed position prevents the natural gas or liquid propane from flowing through the ball valve;
  iii) a check valve being located at the second end portion; and
  iv) a quick disconnect coupling being located at the second end portion;
 b) a connector having a first end and a second end, the connector first end being connected to the unitary valve assembly member second end portion; and
 c) a swivel having:
  i) a first body member including a first end and a second end;
  ii) means for rotatably coupling the first body member first end to the gas appliance, the first body member being rotatable about a fixed first axis with respect to the rotatable coupling means; and
  iii) a second body member having a first end and a second end, the second body member first end being rotatably coupled to the first body member second end, the second body member first end being rotatable about a second axis which intersects the fixed first axis, the second body member having a third axis at the second end thereof, the third axis being parallel to and rotatable about the fixed first axis, the third axis intersecting the second axis, the second member second end connected to the connector second end.

20. The apparatus of claim 19 wherein the unitary valve assembly member check valve includes temperature sensitive means for closing the check valve when a predetermined temperature is reached thus preventing flow of the natural gas or liquid propane through the unitary valve assembly member.

21. The apparatus of claim 19 wherein the connector is a flexible corrugated tubing and the tubing is covered with metal braid.

22. The apparatus of claim 21 wherein the metal braid is coated with plastic.

23. The apparatus of claim 19 further comprising an adapter plug having a first end and a second end, the adapter plug first end being connected to the unitary valve assembly member second end portion and the adapter plug second end being connected to the connector first end.

24. The apparatus of claim 23 wherein the operating means further includes means for preventing the quick disconnect coupling from disengaging from the adapter plug before the ball valve is in the closed position.

25. An apparatus for delivering natural gas or liquid propane under pressure from a main gas supply to a gas appliance, the gas appliance being mounted on casters and being movable to and away from the main gas supply, the apparatus comprising:
 a) a utility distribution means for housing the main gas supply and directing the main gas supply to the gas appliance, the utility distribution means having a fixed gas pipe source connected to and branching from the main gas supply such that the fixed gas pipe source extends from the utility distribution means;
 b) a unitary valve assembly member having a first end portion and a second end portion, the first end portion being directly connected to the fixed gas pipe source, the unitary valve assembly member further comprising:
  i) a ball valve located at the first end portion;
  ii) operating means located at the first end portion and being positioned on an exterior surface of the unitary valve assembly member, the operating means for manually moving the ball valve from an open positioned to a closed position where the ball valve in the open position allows the natural gas or liquid propane to flow through the ball valve and the ball valve in the closed position prevents the natural gas or liquid propane from flowing through the ball valve;
  iii) a check valve located at the second end portion; and
  iv) a quick disconnect coupling located at the second end portion; and
 c) a connector having a first end and a second end, the connector first end connected to the unitary valve assembly member second end portion, the connector second end connected to the gas appliance.

26. The apparatus of claim 25 further comprising a plurality of fixed gas pipe sources branching from the main gas supply and extending from the utility distribution means.

27. The apparatus of claim 25 further comprising an adapter plug having a first end and a second end, the adapter plug first end connected to the unitary valve assembly member second end portion, the adapter plug second end connected to the connector first end, the operating means further including means for preventing the quick disconnect coupling from disengaging from the adapter plug before the ball valve is in the closed position.

28. The apparatus of claim 25 further comprising a swivel having:
   i) a first body member including a first end and a second end;
   ii) means for rotatably coupling the first body member first end to the unitary valve assembly member second end portion, the first body member being rotatable about a fixed first axis with respect to the rotatable coupling means; and
   iii) a second body member having a first end and a second end, the second body member first end being rotatably coupled to the first body member second end, the second body member first end being rotatable about a second axis which intersects the fixed first axis, the second body member having a third axis at the second end thereof, the third axis being parallel to and rotatable about the fixed first axis, the third axis intersecting the second axis, the second body member second end being connected to the connector first end.

29. The apparatus of claim 28 further comprising an adapter plug having a first end and a second end, the adapter plug first end connected to the unitary valve assembly member second end portion, the adapter plug second end connected to the swivel rotatable coupling means, the operating means further including means for preventing the quick disconnect coupling from disengaging from the adapter plug before the ball valve is in the closed position.

30. The apparatus of claim 28 further comprising a second swivel having:
   i) a first body member including a first end and a second end;
   ii) means for rotatably coupling the first body member first end to the gas appliance, the first body member being rotatable about a fixed fourth axis with respect to the rotatable coupling means; and
   iii) a second body member having a first end and a second end, the second body member first end being rotatably coupled to the first body member second end, the second body member first end being rotatable about a fifth axis which intersects the fixed fourth axis, the second body member having a sixth axis at the second end thereof, the sixth axis being parallel to and rotatable about the fixed fourth axis, the sixth axis intersecting the fifth axis, the second body member second end being connected to the connector second end.

31. The apparatus of claim 30 further comprising an adapter plug having a first end and a second end, the adapter plug first end connected to the unitary valve assembly member second end portion, the adapter plug second end connected to the swivel rotatable coupling means, the operating means further including means for preventing the quick disconnect coupling from disengaging from the adapter plug before the ball valve is in the closed position.

32. The apparatus of claim 25 further comprising a swivel having:
   i) a first body member including a first end and a second end;
   ii) means for rotatably coupling the first body member first end to the gas appliance, the first body member being rotatable about a fixed first axis with respect to the rotatable coupling means; and
   iii) a second body member having a first end and a second end, the second body member first end being rotatably coupled to the first body member second end, the second body member first end being rotatable about a second axis which intersects the fixed first axis, the second body member having a third axis at the second end thereof, the third axis being parallel to and rotatable about the fixed first axis, the third axis intersecting the second axis, the second member second end connected to the connector second end.

33. The apparatus of claim 32 further comprising an adapter plug having a first end and a second end, the adapter plug first end connected to the unitary valve assembly member second end portion, the adapter plug second end connected to the swivel rotatable coupling means, the operating means further including means for preventing the quick disconnect coupling from disengaging from the adapter plug before the ball valve is in the closed position.

* * * * *